July 7, 1936.　　　　A. P. JENKINS　　　　2,047,073
WINDSHIELD CLEANING DEVICE
Filed May 14, 1934
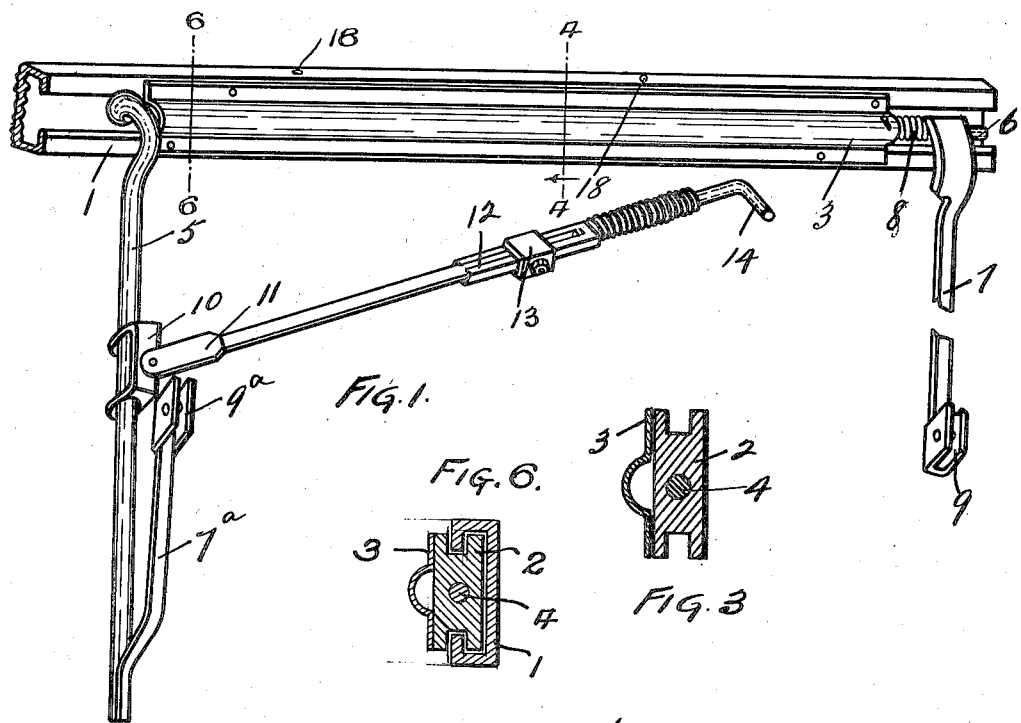
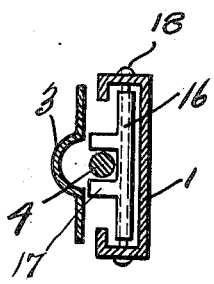
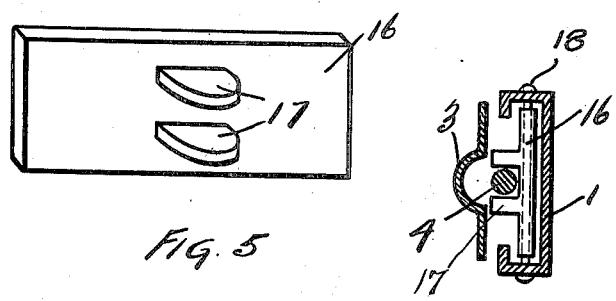
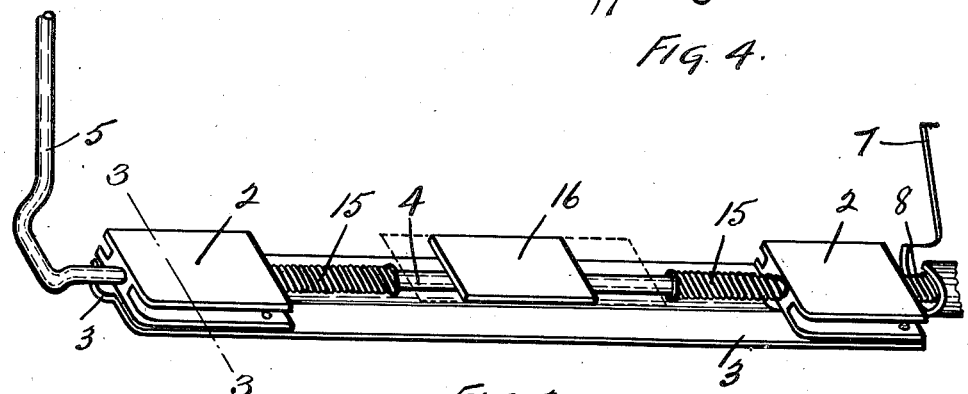
Albert P. Jenkins.
Inventor Patented July 7, 1936

2,047,073

UNITED STATES PATENT OFFICE 2,047,073

WINDSHIELD CLEANING DEVICE

Albert P. Jenkins, Vancouver, British Columbia, Canada

Application May 14, 1934, Serial No. 725,608

5 Claims. (Cl. 15—253)

This invention has to do with improvements in automobile windshield cleaning mechanisms and the present application is in relation with a co-pending application of similar nature filed June 5th, 1933 under Serial No. 674,417.

A particular object of the present application is to show a refined and simplified construction of my previous invention.

Another particular object of my present application is to show an improved slide mechanism having slight frictional resistance and minimum slide surfaces.

A still further object of my invention has been to provide a shock absorbing device to function at the end of each stroke of the cleaning mechanism whereby the operating mechanism is relieved of much strain.

Another object of my invention has been to provide means for the adjustment of the length of the driving arm whereby the stroke of the cleaning mechanism is made adjustable.

Other objects have been to provide improved spring tension means to the wipers and lessen frictional resistance of all moving parts with the object of improving the general efficiency of the device as a whole.

With the above recited objects in view I have perfected the invention that is the subject matter of this application and which is further described in the following specification and illustrated in the accompanying drawing in which:

Figure 1 is an illustration of the principal features of a windshield cleaner shown dismounted from a car. Only a portion of the slide is shown and squeegees have been omitted for the purpose of clarity. An extensible operating arm is shown connected to the slidehead which is shown mounted upon a vertical rod carrying one of the resilient wiper arms.

Figure 2 is a back or rear view of the slidable ribbed bar which is mounted upon grooved slide members in which is mounted a rod member to which is secured the resilient wiper arms shown in Figure 1. Cushioning springs are shown mounted on the rod member between the fixed slide members.

Figure 3 is a detail cross section on the line 3—3 of Figure 2 of one of the slide members carrying the ribbed bar and rod member to which is secured the wiper arms.

Figure 4 is a detail cross section on the line 4—4 of Figure 1 of slideway showing the center spring cushion block mounted on the rod member. In this view the slide member has been omitted for purpose of clarity, but the ribbed bar is shown spaced apart from the slide to indicate its position when mounted.

Figure 5 is a detail view of the center spring cushion block.

Figure 6 is a detail cross section on the line 6—6 of Figure 1.

In the drawing like numerals indicate like parts and the numeral 1 indicates a metal slideway of a length sufficient to span the head of an automobile windshield.

Positioned within the slide way is a pair of spaced apart grooved slide members 2 secured one on each end of a slidable ribbed bar 3 that is mounted over the open side of the slideway 1.

Mounted in the slide members 2 is a rod 4 having a right angled extension 5 at one end thereof while the opposite end 6 projects through the farthest slide member and has mounted thereon the spring squeegee arm 7 the spring tension of which is accentuated by the coiled helical spring 8 one end of which is secured in the ribbed bar 3 while the other end is secured to the head of the arm 7 to maintain a constant pressure of the squeegee (not shown) upon the glass of the windshield.

The squeegee is mounted in the clip 9 shown at the end of the arm 7 and secured by a bolt therein.

The extension 5 hangs dependently downwards from the slide mechanism above and has mounted thereon a slide cross head 10 to which is pivoted one end of the movable arm 11 of the wiping mechanism.

An adjusting sleeve 12 is located intermediate the ends of the arm 11 by which the length and stroke of the arm may be adjusted and secured by the fastening clamp 13

The opposite and right angled end 14 of the arm 11 is secured into the oscillating socket of the wiper mechanism (not shown) in any suitable manner.

Secured upon the end of the extension 5 is the spring squeegee arm 7a and clip 9a for securing therein the usual squeegee.

Mounted upon the rod 4 and intermediate the slide members 2 is a pair of helical springs 15 and intermediate the inner ends thereof is positioned a cushioning block 16 having a pair of projecting lugs 17 on one face that fit over the rod (see Figure 4) and is slidable thereon.

Spaced apart in the center portion of the slideway 1 are a pair fixed pins 18 positioned in such manner that they form a stop and limit the movement of the cushioning block 16 when the device is in operation.

The pins are so positioned that the cushioning block 16 is limited in movement and comes to rest against one of the pins 18 before the stroke of the slidable ribbed bar 3 is completed with the result that the latter part of the stroke of the slidable bar 3 is cushioned by compression of one of the helical springs 15 the same being compressed between the cushioning block 16 and one of the slide members 2 secured upon the end of the slidable bar 3 with the result that a rebound effort is set up at the end of each stroke of the cleaning device that takes much strain off the operating mechanism and gives a start to the return movement of the cleaner.

Having now described my invention and the operating of same what I claim and desire to be protected in by Letters Patent, is:

1. A windshield cleaning device of the kind described comprising in combination with the moving arm of a windshield wiping mechanism, a slideway having a pair of oppositely positioned narrow slide flanges, a pair of grooved slide members fitting said slide flanges and having apertures, said slide members being spaced apart, a slidable bar positioned over the face of said slideway to which slidable bar said slide members are secured in spaced relation, a rod member mounted in the apertures of said slide members, wiper arms secured to said rod member, one of said wiper arms being connected to the movable arm of said wiper mechanism whereby when said wiper mechanism is operated said wiper arms are caused to travers the face of a windshield to clean same.

2. A windshield cleaning device of the kind described comprising in combination with the moving arm of a windshield wiping mechanism, a slideway having a pair of oppositely positioned narrow slide flanges, a pair of grooved slide members fitting said slide flanges and having apertures, said slide members being spaced apart, a slidable bar positioned over the face of said slideway to which slidable bar said slide members are secured in spaced relation, a rod member mounted in the apertures of said slide members, said rod member having a right angled extension at one end thereof, said right angled extension being connected to the movable arm of said wiper mechanism, resilient wiper arms secured to said rod member whereby when said wiper mechanism is operated said wiper arms are caused to traverse the face of a windshield to clean same.

3. A windshield cleaning device of the kind described comprising in combination with the moving arm of a wiper mechanism, a slideway having flanges, a pair of spaced apart grooved slide members fitting said slideway flanges, a slidable ribbed bar secured to said slide members, a rod member having a right angled extension at one end thereof mounted in said slide members, resilient wiper arms connected to said rod member, helical springs mounted upon said rod member and between said slide members, a cushion block mounted slidably upon said rod and between the inner ends of said helical springs, a pair of spaced apart stop pins secured on said slideway adapted to give limited movement to said cushion block when said cleaning device is operating whereby said cushion block and said helical springs form a spring stop to said slidable ribbed bar at each end of the stroke thereof.

4. A windshield cleaning device of the kind described comprising in combination with the moving arm of a wiper mechanism, a slideway having flanges, a pair of spaced apart grooved slide members fitting said slideway flanges, a slidable ribbed bar secured to said slide members, a rod member having a right angled extension at one end thereof mounted in said slide members, resilient wiper arms connected to said rod member, said right angled extension being operatively connected to the moving arm of said wiper mechanism, said moving arm being extensible and contractible whereby the length of same may be varied and adjusted, a pair of fixed abutments spaced apart, cushioning means mounted on said rod member and between said slide members, said abutments being positioned to engage the cushioning means adjacent the end of each wiper stroke whereby the end of each stroke of said slidable ribbed bar is cushioned and subjected to a rebound pressure.

5. A windshield cleaning device of the kind described comprising in combination with the moving arm of a wiper mechanism, a slideway having flanges, a pair of grooved slide members fitting said slideway flanges and spaced apart, a slidable bar secured to said slide members, a right angled extension rod member mounted in said slide members, resilient spring squeegee arms secured upon said rod member, said moving arm having extension means in virtue of which the length of the arm may be varied and adjusted, a connection between said moving arm and said rod member and cushioning a rebound-producing means mounted in cooperative relation to said rod member and to said slide members and the slideway to operate at the end of each stroke of said rod member.

ALBERT P. JENKINS.